(12) United States Patent
Chang et al.

(10) Patent No.: US 9,582,101 B2
(45) Date of Patent: Feb. 28, 2017

(54) METHOD AND ELECTRONIC APPARATUS FOR ADJUSTING DISPLAY FRAMES BY DETECTING TOUCH OF COVER (71) Applicant: Acer Incorporated, New Taipei (TW)

(72) Inventors: Yu-Min Chang, New Taipei (TW); Hsing-Lung Chung, New Taipei (TW)

(73) Assignee: Acer Incorporated, New Taipei (TW)

( * ) Notice: Subject to any disclaimer, the term of this patent is extended or adjusted under 35 U.S.C. 154(b) by 145 days.

(21) Appl. No.: 14/551,097

(22) Filed: Nov. 24, 2014

(65) Prior Publication Data
US 2015/0277602 A1 Oct. 1, 2015

(30) Foreign Application Priority Data

Mar. 26, 2014 (TW) .............................. 103111270 A (51) Int. Cl.
G06F 1/16 (2006.01)
H04M 1/02 (2006.01)
G06F 3/041 (2006.01)
G06F 3/039 (2013.01)

(52) U.S. Cl.
CPC .......... *G06F 3/0416* (2013.01); *G06F 1/1677* (2013.01); *G06F 1/1692* (2013.01); *G06F 3/039* (2013.01); *G06F 2200/1634* (2013.01); *G06F 2203/04804* (2013.01); *H04M 1/0245* (2013.01)

(58) Field of Classification Search
CPC .. G06F 1/1677; G06F 3/039; H04M 1/72575; H04M 2250/22
See application file for complete search history.

(56) References Cited

U.S. PATENT DOCUMENTS

2013/0076614 A1* 3/2013 Ive .................... G06F 1/1677
345/156

FOREIGN PATENT DOCUMENTS

CN 103637529 3/2014

* cited by examiner

*Primary Examiner* — Larry Sternbane
*Assistant Examiner* — Sepehr Azari
(74) *Attorney, Agent, or Firm* — Jianq Chyun IP Office (57) ABSTRACT A method and an electronic apparatus for adjusting display frames by detecting touch of a cover are provided. The electronic apparatus includes a touch screen and a cover, and the cover has at least one transparent area. In the method, a touch of the cover is detected by using the touch screen. At least one cover range of the at least one transparent area of the cover on the touch screen is determined according to a detected energy variation, in which the at least one transparent area and other areas of the cover have different conductivities. The frames displayed by the touch screen are adjusted in response to the at least one cover range of the at least one transparent area on the touch screen.

15 Claims, 5 Drawing Sheets

METHOD AND ELECTRONIC APPARATUS FOR ADJUSTING DISPLAY FRAMES BY DETECTING TOUCH OF COVER

CROSS-REFERENCE TO RELATED APPLICATION

This application claims the priority benefit of Taiwan application serial no. 103111270, filed on Mar. 26, 2014. The entirety of the above-mentioned patent application is hereby incorporated by reference herein and made a part of this specification.

BACKGROUND OF THE INVENTION

[Field of the Invention]

The invention relates to a display method and an apparatus, and more particularly relates to a method and an electronic apparatus for adjusting a display frame according to touch.

[Description of Related Art]

Compared with the traditional keyboard input, the operation of a touch screen is simpler and more intuitive. Therefore, more and more consumer electronic products, such as mobile phones, personal digital assistants, tablet computers, or even laptop computers, desktop computers, and a variety of household appliances use the touch screen instead of the traditional keyboard, as the input interface.

Because the touch screen is vulnerable to scratches caused by foreign objects, many users would purchase protective cases for their portable electronic devices, e.g. smart phones and tablet computers, for protecting the screens when the devices are not in use. Generally, such protective cases are opaque. When the touch screen is covered by the protective case, the user is not able to see the frame of the touch screen directly. Thus, to read a message received by the electronic device, the user needs to open the protective case by hand and unlock the device to open the application program, which may be inconvenient for the user. Even though some protective cases may be formed with holes or transparent areas, the electronic devices are unable to detect the positions of the holes or transparent areas and can only display the full frame. Besides, some electronic devices may be able to display frames at predetermined positions based on the original settings; however, such a method is not applicable to all brands or types of protective cases.

SUMMARY OF THE INVENTION

The invention provides a method and an electronic apparatus for adjusting display frames by detecting touch of a cover, wherein a cover range of a transparent area of the cover on a touch screen is detected for adjusting a frame displayed by the touch screen accordingly.

According to the invention, a method of adjusting display frames by detecting touch on a cover is adapted for an electronic apparatus that includes a touch screen and the cover, wherein the cover has at least one transparent area. In the method, a touch of the cover is detected by using the touch screen, so as to determine at least one cover range of the at least one transparent area of the cover on the touch screen based on a detected energy variation, wherein the at least one transparent area and other areas of the cover have different conductivities. A frame displayed by the touch screen is adjusted according to the at least one cover range of the at least one transparent area on the touch screen.

An electronic apparatus of the invention includes a touch screen and a processor. The touch screen is configured to display a frame and detect touch of the cover, wherein the cover has at least one transparent area, and the at least one transparent area and other areas of the cover have different conductivities. The processor is coupled to the touch screen and determines at least one cover range of the at least one transparent area of the cover on the touch screen based on an energy variation detected by the touch screen, so as to adjust the frame displayed by the touch screen accordingly.

Based on the above, in the method and electronic apparatus for adjusting the display frames by detecting touch of the cover according to the invention, materials having different conductivities are used to fabricate or cover the transparent area and non-transparent area of the cover, such that the cover range of the transparent area can be determined based on the detected energy variation when the touch screen is covered by the cover, so as to adjust the frame displayed by the touch screen. Thus, variability of the touch operation and frame display of the electronic apparatus is increased.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

The invention is to fabricate at least one transparent area in a cover of an electronic apparatus with transparent conductive materials or to cover at least one non-transparent area of the cover with conductive materials according to the principle of touch detection. Thereby, when the user covers a touch screen with the cover, the touch screen can adjust a frame displayed thereby and/or a touch detection area based on factors, such as the energy that is detected, whether the areas having large energy form consecutive areas, whether the consecutive areas are large enough, and whether the shape of the consecutive areas matches a predetermined shape, so as to achieve the effect of power saving. In addition, the invention further determines a touch operation the user performs on the transparent area and correspondingly adjusts the frame displayed in the transparent area, thereby increasing the variability of the touch operation and frame display of the electronic apparatus.

Figure 1:
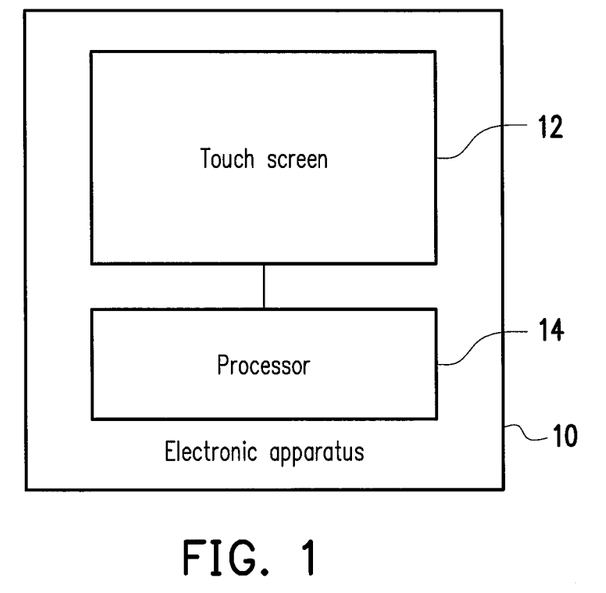
FIG. 1 is a block diagram illustrating an electronic apparatus according to an embodiment of the invention.

FIG. 1 is a block diagram illustrating an electronic apparatus according to an embodiment of the invention. With reference to FIG. 1, an electronic apparatus 10 is a device having a touch and display function, such as a mobile phone, a smart phone, a personal digital assistant (PDA), or a tablet PC, and the invention is not limited thereto.

The electronic apparatus 10 includes a touch screen 12 and a processor 14. The touch screen 12 is an input and output interface of the electronic apparatus 10 and is configured to display various frames of the electronic apparatus 10 and detect a touch operation the user performed on the frame and a touch of a cover (not shown). The touch screen 12 is formed by combining a display, such as a liquid crystal display (LCD), a light-emitting diode (LED) display, a field emission display (FED), or other types of displays, with a resistive or capacitive touch panel and provides display and touch detection functions simultaneously.

The processor 14 is coupled to the touch screen 12 and may be a single-core or multi-core central processing unit (CPU), a programmable microprocessor for general use or special use, a digital signal processor (DSP), a programmable controller, an application specific integrated circuit (ASIC), other similar devices, or a combination of the foregoing. In this embodiment, the processor 14 is capable of executing a computer program so as to perform a method of adjusting a display frame by detecting touch of the cover in the embodiment of the invention.

Figure 2:
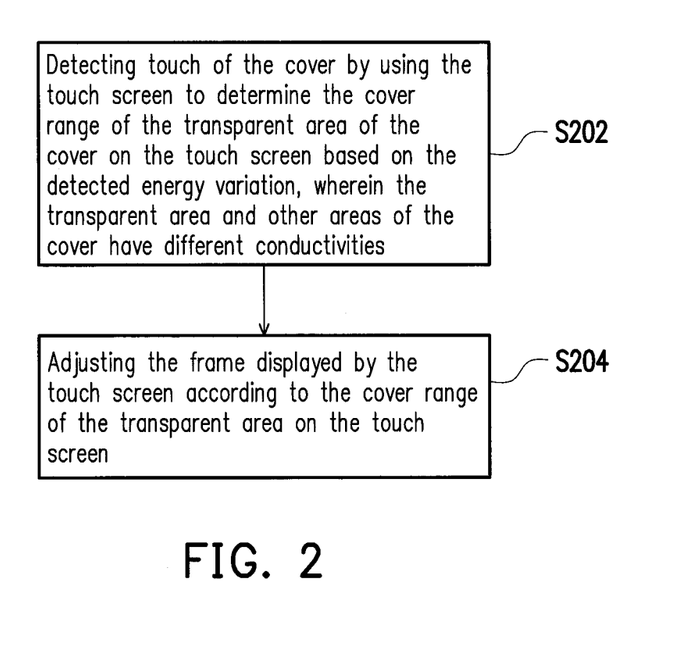
FIG. 2 is a flowchart illustrating a method of adjusting display frames by detecting touch on a cover according to an embodiment of the invention.

FIG. 2 is a flowchart illustrating the method of adjusting the display frame by detecting touch of the cover according to an embodiment of the invention. With reference to FIG. 1 and FIG. 2, the method of this embodiment is adapted for the electronic apparatus 10. Steps of the method of this embodiment are explained in detail below with reference to the components in the electronic apparatus 10 of FIG. 1.

First, the processor 14 of the electronic apparatus 10 detects touch of the cover by the touch screen 12 and determines at least one cover range of at least one transparent area of the cover on the touch screen 12 based on an energy variation detected by the touch screen 12, wherein the at least one transparent area and other areas of the cover have different conductivities (Step S202). Because of the different conductivities, the touch screen 12 obtains different energy values when detecting the transparent area and a non-transparent area of the cover. Accordingly, the touch screen 12 determines the cover range of the transparent area of the cover thereon based on the detected energy variation.

To be more specific, in an embodiment, at least one transparent area is fabricated in the cover of the electronic apparatus with use of a transparent conductive material. A non-conductive material or a material having lower conductivity may be used to form other areas of the cover. In another embodiment, similar to the above, at least one transparent area is disposed in the cover of the electronic apparatus, but the at least one transparent area is fabricated using a non-conductive material or a material having lower conductivity, is formed by a hole directly. The other areas of the cover are fabricated using a material having higher conductivity. Due to the difference in the conductivities of the transparent area and the non-transparent area, the energy values detected by the touch screen 12 significantly differ from each other, and thereby the transparent area can be determined.

It is noted that, in yet another embodiment, the processor 14 of the electronic apparatus 10 further determines the transparent area based on factors, such as the detected energy values, whether the areas having larger energy values form consecutive areas, and whether the consecutive areas are larger than a specific value.

Figure 3:
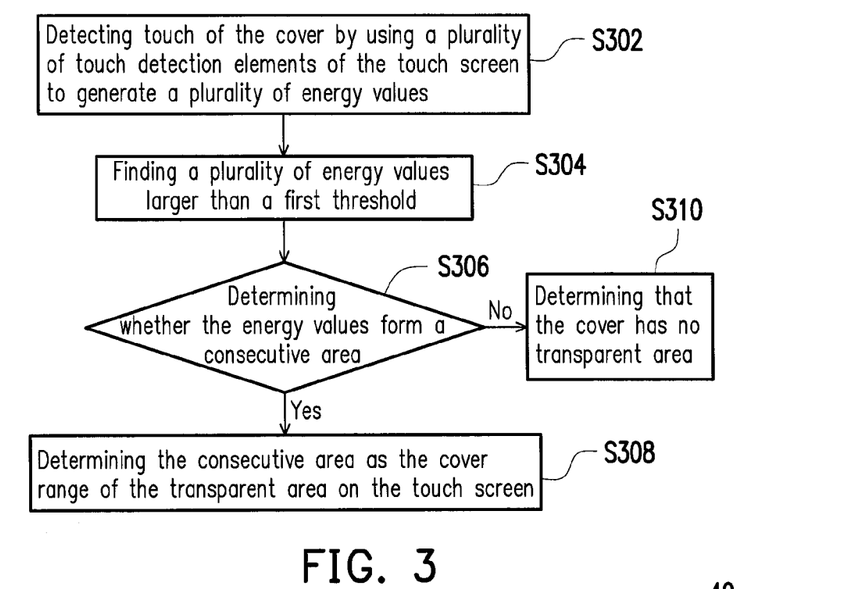
FIG. 3 is a flowchart illustrating a method of determining a cover range of the cover on a touch screen based on energy variation according to an embodiment of the invention.

For example, FIG. 3 is a flowchart illustrating a method of determining the cover range of the cover on the touch screen based on energy variation according to an embodiment of the invention. With reference to FIG. 1 and FIG. 3, the method of this embodiment is adapted for the electronic apparatus 10. Steps of the method of this embodiment are explained in detail below with reference to the components in the electronic apparatus 10 of FIG. 1.

First, the processor 14 detects touch of the cover by using a plurality of touch detection elements of the touch screen 12 to generate a plurality of energy values (Step S302). The energy value is, for example, a capacitance value detected by a plurality of capacitive sensors in a capacitive touch screen or other energy value detected by touch detection elements in other types of touch screens. Nevertheless, the invention is not limited to the above.

Then, the processor 14 compares the detected energy values with a first threshold to find a plurality of energy values larger than the first threshold (Step S304) and determines whether the energy values that are larger than the first threshold form at least one consecutive area (Step S306), wherein a difference between the energy values in each consecutive area is smaller than a second threshold. If the energy values can form at least one consecutive area, the processor 14 determines that the consecutive area is the cover range of the transparent area of the cover on the touch screen 12 (Step S308). On the other hand, if the energy values do not form consecutive areas, the processor 14 determines that the cover has no transparent area (Step S310).

More specifically, because the transparent area (or the non-transparent area) of the cover is fabricated by the same conductive material, when the cover covers the touch screen 12, the energy values detected by touch screen 12 should be in a specific range and form a consecutive area.

Figure 4:
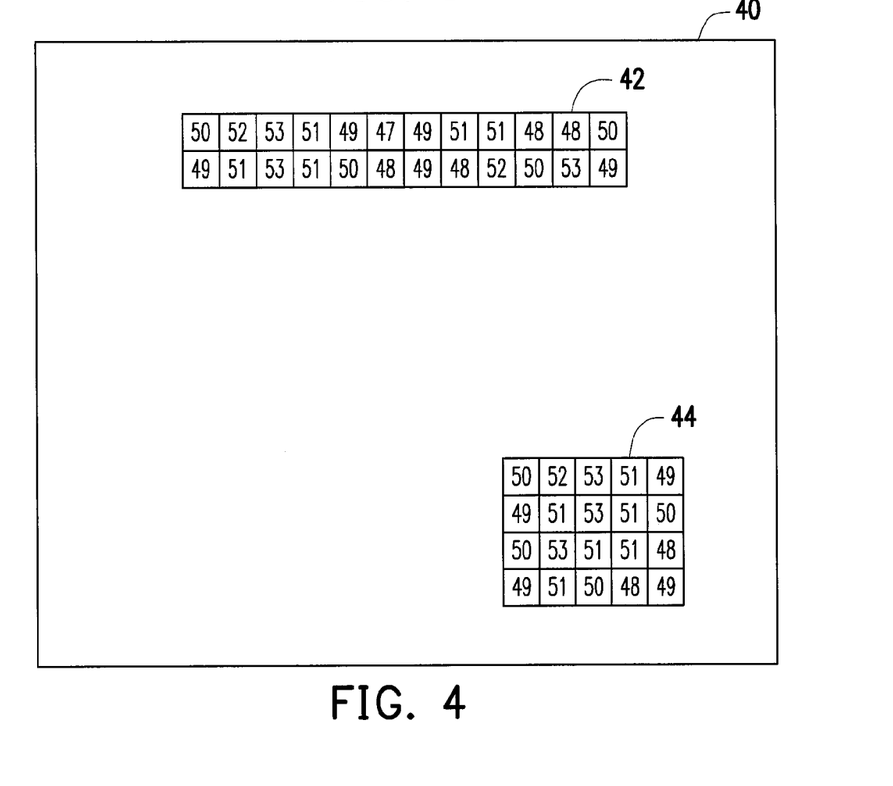
FIG. 4 is a schematic diagram illustrating consecutive areas according to an embodiment of the invention.

For example, FIG. 4 is a schematic diagram illustrating consecutive areas according to an embodiment of the invention. With reference to FIG. 4, a touch screen 40, for example, uses a plurality of touch detection elements to detect touch of the cover to obtain a plurality of energy values and to find energy values that are larger than a threshold (e.g. 30), so as to determine whether consecutive areas are formed. It is known from FIG. 4 that the energy values detected by the touch detection elements in a block 42 are all larger than 30 and are in a range of 47-53 (i.e. a difference thereof is smaller than 6). Moreover, the energy values detected in a block 44 are all larger than 30 as well and are in a range of 48-53 (i.e. a difference thereof is also smaller than 6). Accordingly, it is determined that the blocks 42 and 44 are cover ranges of the cover on the touch screen 40.

Figures 5A, 5B, 6:
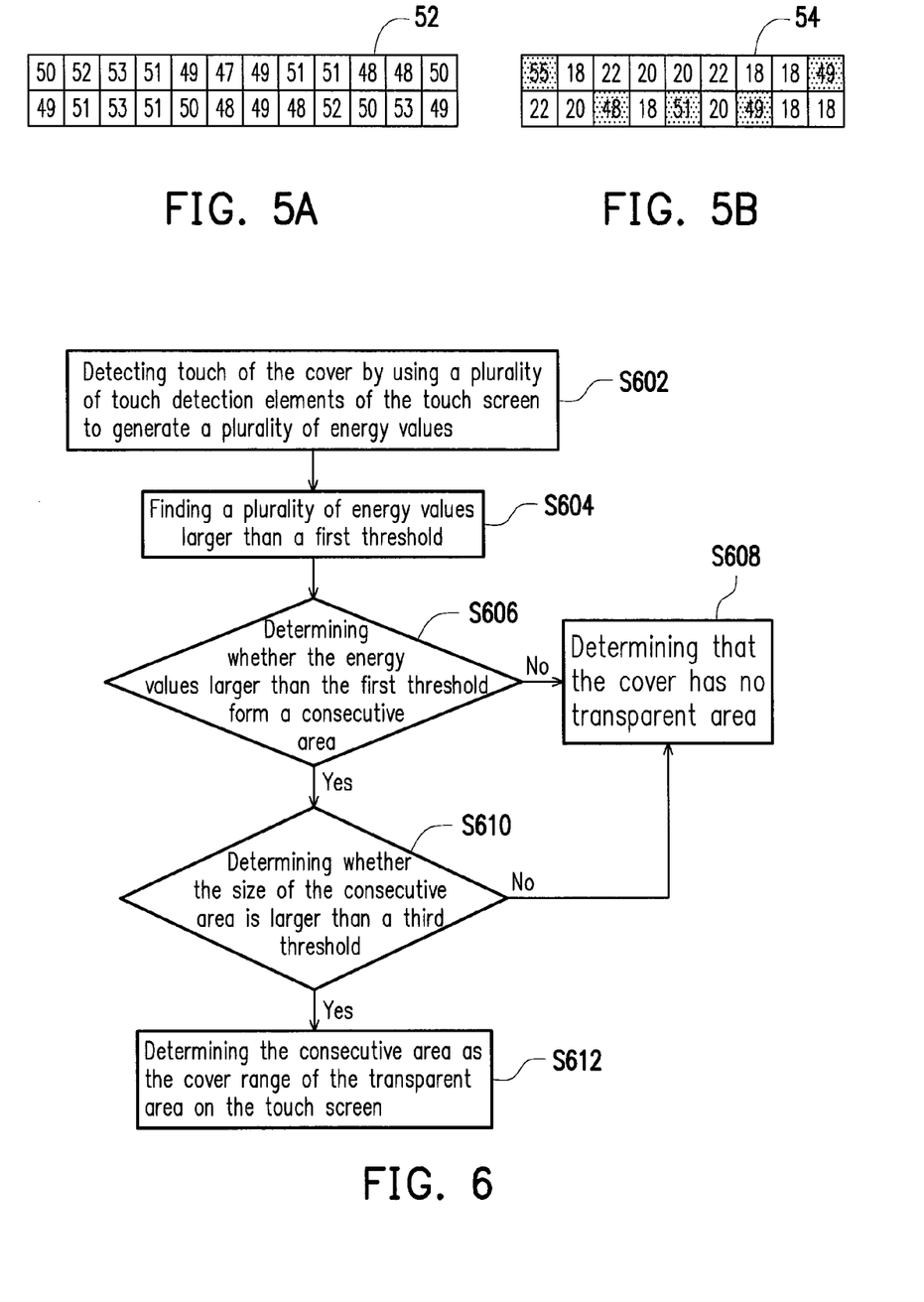
FIG. 5A and FIG. 5B are schematic diagrams illustrating consecutive areas according to an embodiment of the invention.
FIG. 6 is a flowchart illustrating a method of determining the cover range of the cover on the touch screen based on energy variation according to an embodiment of the invention.

FIG. 5A and FIG. 5B are schematic diagrams illustrating consecutive areas according to an embodiment of the invention. With reference to FIG. 5A, in this embodiment, the energy values in a block 52 are in a range of 47-53 (i.e. a difference thereof is smaller than 6) and thus are deemed as one consecutive area. However, with reference to FIG. 5B, an obvious difference is observed between the energy values (in a range of 48-55) detected by the touch detection elements with deeper colors and the energy values (in a range of 18-22) detected by other touch detection elements with lighter colors in a block 54. Therefore, the block 54 is not deemed as one consecutive area.

It is noted that, in both the embodiments of FIG. 4, FIG. 5A and FIG. 5B, the consecutive areas are determined as the cover ranges of the transparent areas of the cover on the touch screen, and such a determination is made based on the premise that the transparent area is fabricated using a transparent conductive material. However, in another embodiment where the non-transparent area of the cover is fabricated using a conductive material, the electronic apparatus determines areas other than the consecutive areas (i.e. corresponding to the non-transparent areas) as the cover range of the transparent area of the cover on the touch screen.

Moreover, in the embodiments of FIG. 4, FIG. 5A and FIG. 5B, the cover range of the transparent area of the cover on the touch screen is determined merely based on whether the energy values form consecutive areas. However, in yet another embodiment, to assure that the touch is not caused by a finger or other foreign objects, the size of the consecutive area is also taken into consideration. That is, one consecutive area is determined as the cover range of the transparent area of the cover on the touch screen only when the size of the consecutive area is larger than a specific value. Another embodiment is explained in detail below.

FIG. 6 is a flowchart illustrating a method of determining the cover range of the cover on the touch screen based on energy variation according to an embodiment of the invention. With reference to FIG. 1 and FIG. 6, the method of this embodiment is adapted for the electronic apparatus 10. Steps of the method of this embodiment are explained in detail below with reference to the components in the electronic apparatus 10 of FIG. 1.

First, the processor 14 detects touch of the cover by using a plurality of touch detection elements of the touch screen 12, so as to generate a plurality of energy values (Step S602). Then, the processor 14 compares the detected energy values with a first threshold and finds a plurality of energy values that are larger than the first threshold (Step S604) to determine whether the energy values larger than the first threshold form at least one consecutive area (Step S606). If the processor 14 determines that the energy values larger than the first threshold do not form consecutive areas, the processor 14 determines that the cover has no transparent area (Step S608). The above steps S602 to S608 are the same as or similar to steps S302 to S306 and S310 of the previous embodiment. Thus, details are not repeated hereinafter.

A difference between this embodiment and the previous embodiment lies in that: in this embodiment, when the processor 14 determines that the energy values larger than the first threshold form consecutive areas (i.e. a difference between the energy values in each consecutive area is smaller than the second threshold), the processor 14 further determines whether the size of each consecutive area is larger than a third threshold (Step S610). If the processor 14 determines that the size of the consecutive area is larger than the third threshold, the processor 14 determines that this consecutive area is the cover range of the transparent area of the cover on the touch screen 12 (Step S612). On the other hand, if the processor 14 determines that the size of the consecutive area is not larger than the third threshold, the processor 14 determines that the cover has no transparent area (Step S608).

Returning to the flowchart of FIG. 6, when the processor 14 determines the cover range of the transparent area of the cover on the touch screen 12, the frame displayed on the touch screen 12 is adjusted according to the cover range (Step S604). In an embodiment, the processor 14, for example, controls the touch screen 12 to display the frame only in the cover range, so as to achieve the effect of power saving. Moreover, in another embodiment, the processor 14 further adjusts a content of the displayed frame according to a characteristic of the cover range, wherein the characteristic includes one or a combination of a shape or a size. For example, the processor 14 determines whether the shape of the cover range matches a predetermined shape, so as to display the frame corresponding to the predetermined shape in the cover range.

By the aforementioned determination method, the electronic apparatus 10 accurately determines the cover range of the transparent area of the cover on the touch screen 12 to adjust the frame displayed on the touch screen 12. It is noted that, in another embodiment, the electronic apparatus 10 first detects whether the touch screen is covered by the cover and starts to detect the touch of the cover only when detecting the cover thereon, thereby achieving the effect of power saving. Moreover, after the electronic apparatus 10 adjusts the display frame, for example, the user's touch in the cover range is continuously detected, so as to determine the touch operation the user performed on the frame in the cover range and adjust the content of the frame accordingly. Another embodiment is explained in detail below.

Figure 7:
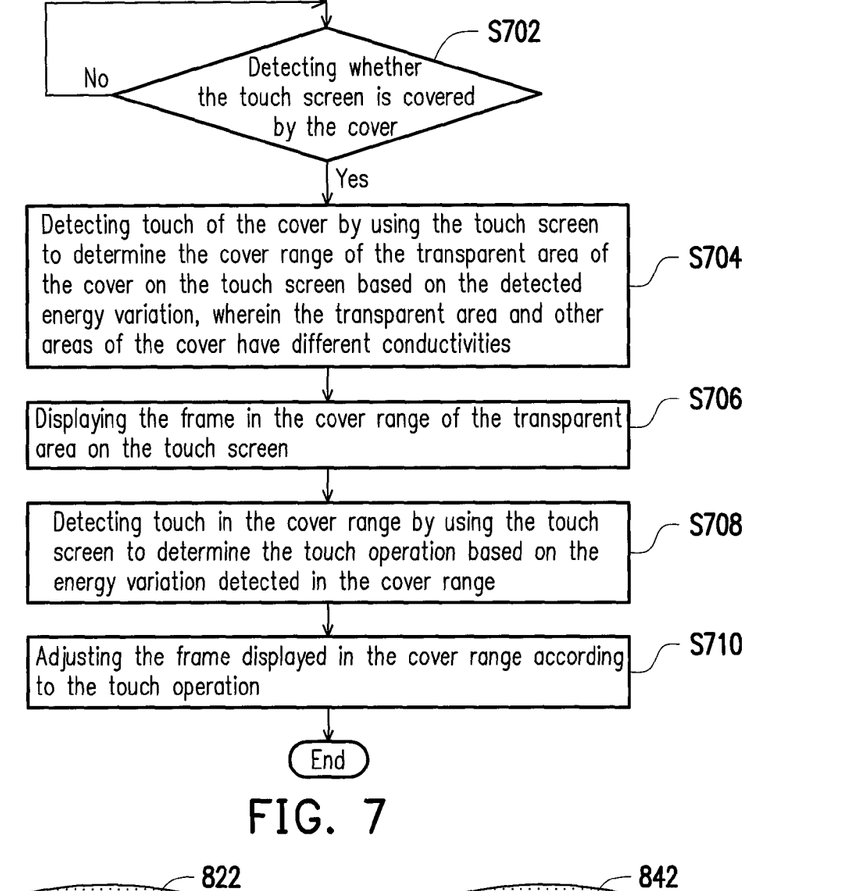
FIG. 7 is a flowchart illustrating a method of adjusting display frames by detecting touch of the cover according to an embodiment of the invention.

FIG. 7 is a flowchart illustrating a method of adjusting display frames by detecting touch of the cover according to an embodiment of the invention. With reference to FIG. 1 and FIG. 7, the method of this embodiment is adapted for the electronic apparatus 10. Steps of the method of this embodiment are explained in detail below with reference to the components in the electronic apparatus 10 of FIG. 1.

First, the processor 14 detects whether the touch screen 12 is covered by the cover by using a button or a sensor disposed on the electronic apparatus 10 (Step S702). The sensor is, for example, a pressure sensor, a light sensor, a proximity sensor, a Hall sensor, or other types of sensors. However, the invention is not limited thereto.

If the processor 14 detects that the touch screen 12 is not covered by the cover, the processor 14 is not required to detect touch of the cover and thus continues detecting whether the touch screen 12 is covered by the cover. When the processor 14 detects that the touch screen 12 is covered by the cover, the processor 14 detects the touch of the cover by using the touch screen 12 so as to determine at least one cover range of at least one transparent area of the cover on the touch screen 12 based on an energy variation detected by the touch screen 12, wherein the at least one transparent area and other areas of the cover have different conductivities (Step S704). Step S704 is the same as or similar to Step S202 of the previous embodiment. Thus, details thereof are not repeated hereinafter.

A difference between this embodiment and the previous embodiment lies in that: in this embodiment, when the processor 14 determines the cover range of the transparent area of the cover on the touch screen 12, the processor 14 adjusts the frame displayed on the touch screen 12 according to the cover range so as to display the frame only in the cover range (Step S706), thereby achieving the effect of power saving. In addition to adjusting the area of the frame displayed by the touch screen 12 according to the cover range, the processor 14 further adjusts a touch detection area of the touch screen 12 to perform touch detection only in the cover range. However, the invention is not limited thereto. Corresponding to the configuration of the transparent area in the cover, the number of the cover ranges determined by the touch screen 12 is not necessarily one, and the number of the frames displayed in the cover range is not necessarily one, either.

Figure 8A:
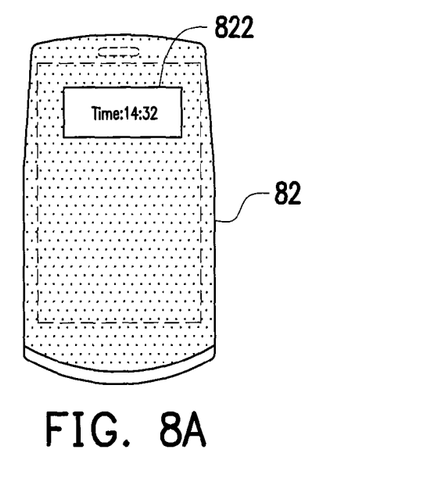
FIG. 8A and FIG. 8B illustrate examples of displaying frames in the cover range of a transparent area of the cover according to an embodiment of the invention.
Figure 8B:
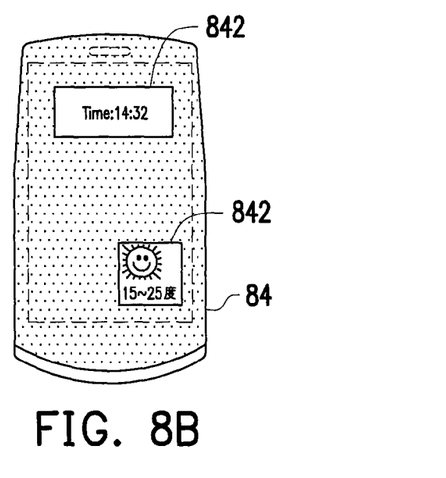

For example, FIG. 8A and FIG. 8B illustrate examples of displaying frames in the cover range of the transparent area of the cover according to an embodiment of the invention. First, with reference to FIG. 8A, in a situation where the cover is put thereon (i.e. the hatching area in FIG. 8A), when an electronic apparatus 82 detects only a cover range 822 of one transparent area, the frame is displayed only in the cover range 822. Next, with reference to FIG. 8B, similar to the above, in the situation where the cover is put thereon (i.e. the hatching area in FIG. 8B), when an electronic apparatus 84 detects cover ranges 842 and 844 of two transparent areas, different frames are respectively displayed in the cover ranges 842 and 844.

Returning to the flowchart of FIG. 7, after the processor 14 adjusts the frame displayed on the touch screen 12, the processor 14 detects touch in the cover range by using the touch screen 12, so as to determine the touch operation of the user based on the energy variation detected in the cover range (Step S708). It is known from the descriptions of the above embodiments that, when the touch screen 12 is covered by the cover, the conductivity of the transparent area causes the touch screen 12 to detect a higher energy value in the cover range. With this energy value as the reference, if the user further touches the touch screen 12 in the transparent area (i.e. the cover range), the touch screen 12 detects an even higher energy value. Based on the distribution and variation of the relatively higher energy values, the processor 14 determines the touch operation of the user.

When the processor 14 detects the touch operation of the user by the touch screen 12, the processor 14 adjusts the frame displayed in the cover range according to the touch operation (Step S710). A method by which the processor 14 adjusts the frame is, for example, to switch the frames in all the cover ranges (in a situation of multiple cover ranges), or only adjust the frame in the cover range (in a situation of one single cover range or multiple cover ranges) where the touch operation is detected. However, the invention is not limited thereto.

Figure 9A:
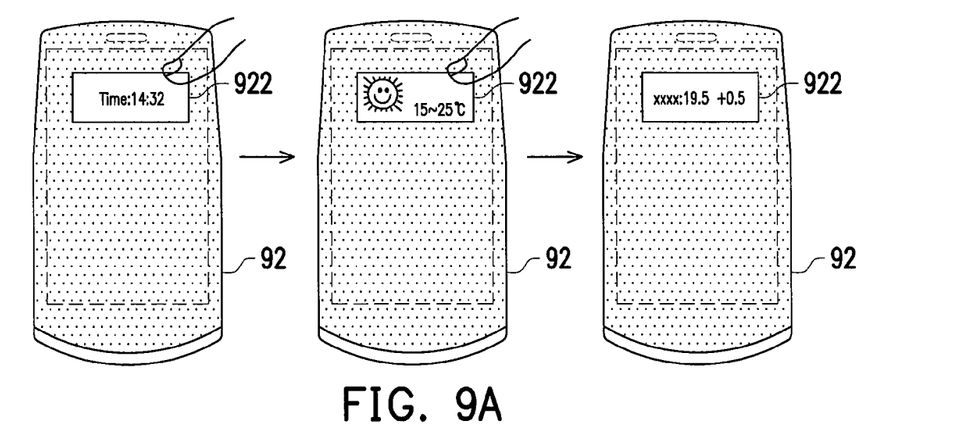
FIG. 9A to FIG. 9C illustrate examples of displaying frames in the cover range of the transparent area of the cover according to an embodiment of the invention.
Figure 9B:
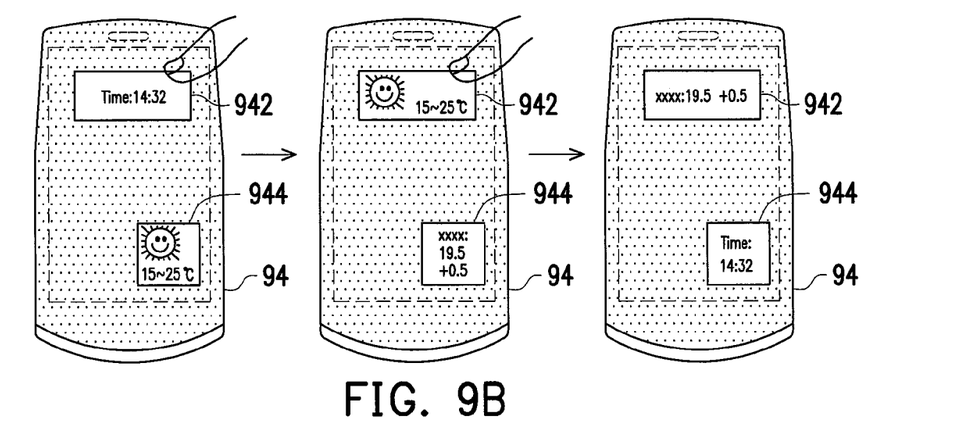
Figure 9C:
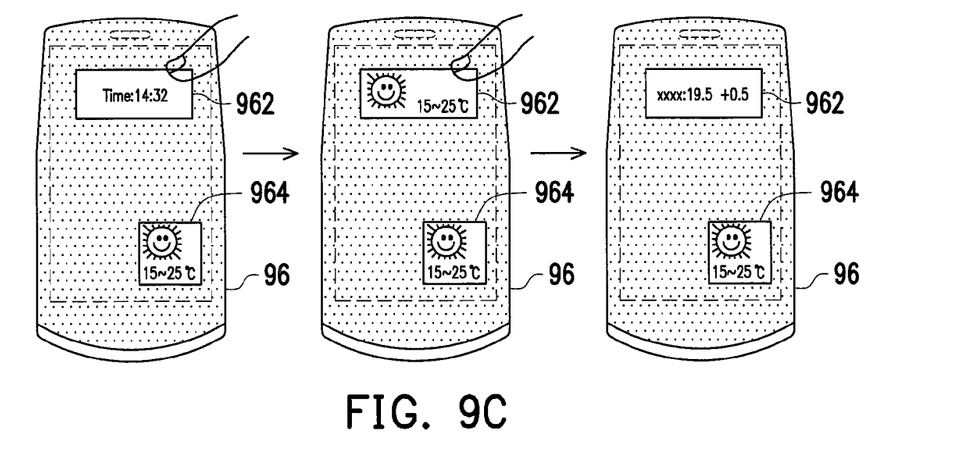

For example, FIG. 9A to FIG. 9C illustrate examples of displaying frames in the cover range of the transparent area of the cover according to an embodiment of the invention. First, with reference to FIG. 9A, in the situation where the cover is put thereon (i.e. the hatching area of FIG. 9A), if an electronic apparatus 92 detects a cover range 922 of only one transparent area, namely, the frame is displayed only in the cover range 922, and subsequently detects the touch operation of the user performed in the cover range 922, the electronic apparatus 92 further switches the frame displayed in the cover range 922. Next, with reference to FIG. 9B, similar to the above, in the situation where the cover is put thereon (i.e. the hatching area of FIG. 9B), if an electronic apparatus 94 detects cover ranges 942 and 944 of two transparent areas, namely, different frames are respectively displayed in the cover ranges 942 and 944, and subsequently detects the touch operation of the user performed in the cover range 942, the electronic apparatus 92 further switches the frames displayed in the cover ranges 942 and 944. For example, information about time, weather, and stock is switched between the cover ranges. At last, with reference to FIG. 9C, similar to the above, in the situation where the cover is put thereon (i.e. the hatching area of FIG. 9C), if an electronic apparatus 96 detects cover ranges 962 and 964 of two transparent areas, namely, different frames are respectively displayed in the cover ranges 962 and 964, and subsequently detects the touch operation of the user performed in the cover range 962, the electronic apparatus 92 only switches the frame displayed in the cover range 962 while keeping the frame displayed in the cover range 964 unchanged. The aforementioned touch operation may be any type of touch operation, such as tap, double tap, press, drag, and pinch, or a combination of these touch operations. However, the invention is not limited to the above.

By the aforementioned frame display and touch detection method, the electronic apparatus 10 is capable of changing the displayed frames according to the user's touch operation in the transparent area (i.e. the cover range), thereby increasing the variability of touch operation and frame display.

To sum up, in the method and electronic apparatus for adjusting the display frames by detecting touch of the cover according to the invention, the cover of the apparatus is provided with the transparent area, such that the user is not required to open the cover, and the operation process is simplified. By fabricating or covering the transparent area or the non-transparent area with conductive materials, the electronic apparatus is capable of determining the cover range of the transparent area of the cover on the touch screen, so as to adjust the displayed frame and reduce power consumption of the screen.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A method for adjusting a display frame by detecting a touch of a cover, adapted for an electronic apparatus having a touch screen and the cover which comprises at least one transparent area, wherein the at least one transparent area and other areas of the cover have different conductivities, the method comprising:
   detecting the touch of the cover by using the touch screen and determining at least one cover range of the at least one transparent area of the cover on the touch screen based on a detected energy variation resulting from differences of conductivity between the at least one transparent area and the other areas of the cover; and
   adjusting a frame displayed by the touch screen according to the at least one cover range of the at least one transparent area on the touch screen.

2. The method according to claim 1, wherein, after the step of detecting the touch of the cover by the touch screen and deteimining the at least one cover range of the at least one transparent area of the cover on the touch screen based on the detected energy variation, the method further comprises:
   adjusting a touch detection area of the touch screen according to the at least one cover range of the at least one transparent area on the touch screen.

3. The method according to claim 1, wherein the step of detecting the touch of the cover by the touch screen and determining the at least one cover range of the at least one transparent area of the cover on the touch screen based on the detected energy variation comprises:
  detecting the touch of the cover by a plurality of touch detection elements of the touch screen to generate a plurality of energy values;
  finding a plurality of energy values larger than a first threshold;
  determining whether the energy values larger than the first threshold form at least one consecutive area, wherein a difference between the energy values in each consecutive area is smaller than a second threshold; and
  determining the at least one consecutive area or an area other than the at least one consecutive area of the touch screen as the at least one cover range of the at least one transparent area on the touch screen.

4. The method according to claim 1, wherein the step of detecting the touch of the cover by the touch screen and determining the at least one cover range of the at least one transparent area of the cover on the touch screen based on the detected energy variation comprises:
  detecting the touch of the cover by a plurality of touch detection elements of the touch screen to generate a plurality of energy values;
  finding a plurality of energy values larger than a first threshold;
  determining whether the energy values larger than the first threshold form at least one consecutive area, wherein a difference between the energy values in each consecutive area is smaller than a second threshold;
  determining whether a size of each consecutive area is larger than a third threshold; and
  determining the at least one consecutive area with size larger than the third threshold or an area other than the at least one consecutive area of the touch screen as the at least one cover range of the at least one transparent area on the touch screen.

5. The method according to claim 1, wherein the step of adjusting the frame displayed by the touch screen according to the at least one cover range of the at least one transparent area on the touch screen comprises:
  displaying the frame only in the at least one cover range.

6. The method according to claim 5, wherein the step of adjusting the frame displayed by the touch screen according to the at least one cover range of the at least one transparent area on the touch screen further comprises:
  adjusting a content of the displayed frame according to a characteristic of the at least one cover range, wherein the characteristic comprises one or a combination of a shape and a size.

7. The method according to claim 1, wherein, after the step of adjusting the frame displayed by the touch screen according to the at least one cover range of the at least one transparent area on the touch screen, the method further comprises:
  detecting an energy variation in the at least one cover range by using the touch screen to determine a touch operation; and
  adjusting the frame displayed in the at least one cover range according to the touch operation.

8. The method according to claim 7, wherein the step of adjusting the frame displayed in the at least one cover range according to the touch operation comprises:
  switching the frames in all of the at least one cover range according to the touch operation or only adjusting the frame in the cover range where the touch operation is detected.

9. The method according to claim 1, wherein, before the step of detecting the touch of the cover by using the touch screen, the method further comprises:
  detecting whether the touch screen is covered by the cover by using a button or a sensor, and detecting the touch of the cover by using the touch screen when detecting that the touch screen is covered by the cover, wherein the sensor comprises a pressure sensor, a light sensor, a proximity sensor, or a Hall sensor.

10. An electronic apparatus, comprising:
  a touch screen, configured to display a frame and detect a touch of a cover, wherein the cover comprises at least one transparent area, and the at least one transparent area and other areas of the cover have different conductivities; and
  a processor, coupled to the touch screen and configured to determine at least one cover range of the at least one transparent area of the cover on the touch screen based on an energy variation resulting from differences of conductivity between the at least one transparent area and the other areas of the cover detected by the touch screen to adjust the frame displayed by the touch screen accordingly.

11. The electronic apparatus according to claim 10, wherein the processor further adjusts a touch detection area of the touch screen according to the at least one cover range of the at least one transparent area on the touch screen.

12. The electronic apparatus according to claim 10, wherein the processor detects the touch of the cover by using a plurality of touch detection elements of the touch screen to generate a plurality energy values, finds a plurality of energy values larger than a first threshold, and determines whether the energy values larger than the first threshold form at least one consecutive area, so as to determine the at least one consecutive area or an area other than the at least one consecutive area of the touch screen as the at least one cover range of the at least one transparent area on the touch screen, wherein a difference between the energy values in each consecutive area is smaller than a second threshold.

13. The electronic apparatus according to claim 10, wherein the processor detects the touch of the cover by using a plurality of touch detection elements of the touch screen to generate a plurality energy values, finds a plurality of energy values larger than a first threshold, determines whether the energy values larger than the first threshold form at least one consecutive area, determines whether a size of each consecutive area is larger than a third threshold, and determines the at least one consecutive area with size larger than the third threshold or an area other than the at least one consecutive area of the touch screen as the at least one cover range of the at least one transparent area on the touch screen, wherein a difference between the energy values in each consecutive area is smaller than a second threshold.

14. The electronic apparatus according to claim 10, wherein the processor displays the frame only in the at least one cover range according to the at least one cover range of the at least one transparent area on the touch screen.

15. The electronic apparatus according to claim 10, wherein the processor further adjusts a content of the displayed frame according to a characteristic of the at least one cover range, wherein the characteristic comprises one or a combination of a shape and a size.

* * * * *